United States Patent
Spahr et al.

(10) Patent No.: US 9,731,546 B2
(45) Date of Patent: Aug. 15, 2017

(54) WHEEL AND SPOKE, IN PARTICULAR FOR A BICYCLE

(71) Applicant: DT SWISS INC., Grand Junction, CO (US)

(72) Inventors: Stefan Spahr, Lengnau (CH); Martin Walthert, Aarberg (CH)

(73) Assignee: DT SWISS INC., Grand Junction, CO (US)

(*) Notice: Subject to any disclaimer, the term of this patent is extended or adjusted under 35 U.S.C. 154(b) by 0 days.

(21) Appl. No.: 15/061,619

(22) Filed: Mar. 4, 2016

(65) Prior Publication Data
US 2016/0257164 A1 Sep. 8, 2016

(30) Foreign Application Priority Data
Mar. 6, 2015 (DE) .......... 10 2015 103 327

(51) Int. Cl.
*B60B 1/02* (2006.01)
*B60B 1/04* (2006.01)
*B60B 1/00* (2006.01)

(52) U.S. Cl.
CPC ............ *B60B 1/0261* (2013.01); *B60B 1/003* (2013.01); *B60B 1/0246* (2013.01); *B60B 1/043* (2013.01);
(Continued)

(58) Field of Classification Search
CPC ....... B60B 1/0261; B60B 1/043; B60B 1/003; B60B 1/0246; B60B 2900/112; B60B 2900/1216; B60B 2360/10; B60B 1/00
(Continued)

(56) References Cited

U.S. PATENT DOCUMENTS 1,560,565 A * 11/1925 Graham .................... B60B 1/00
29/894.33
3,894,777 A 7/1975 Yamada
(Continued)

FOREIGN PATENT DOCUMENTS

DE 29811076 U1 10/1998
EP 0794071 A2 9/1997
(Continued)

OTHER PUBLICATIONS

German Search Report from German Patent Application No. 10 2015 103 327.5, mailed Dec. 8, 2015.
(Continued)

*Primary Examiner* — S. Joseph Morano
*Assistant Examiner* — Jean Charleston
(74) *Attorney, Agent, or Firm* — Greer, Burns & Crain, Ltd.

(57) ABSTRACT

A bicycle spoke has a spoke body having two remote ends, a rim end, and a hub end. The elongated body includes a longitudinally flattened cross-section. The body includes a first end portion thickness at the hub end transverse to a longitudinal plane. The body includes a second end portion thickness at the rim-side end transverse to the longitudinal plane. The body includes in a first center region disposed closer to the first end portion than to the second end portion, a first center region thickness transverse to the longitudinal plane that is less than the first end portion thickness. In a second center region disposed closer to the second end portion than to the first end portion, the body has the flattened cross-section wherein the second center region includes a second center region thickness transverse to the longitudinal plane that is less than the first center region thickness.

17 Claims, 3 Drawing Sheets

(52) U.S. Cl.
    CPC ............ *B60B 1/00* (2013.01); *B60B 2360/10* (2013.01); *B60B 2900/112* (2013.01); *B60B 2900/1216* (2013.01)

(58) Field of Classification Search
    USPC .................................. 301/57, 61, 104, 110.5
    See application file for complete search history.

(56) References Cited

U.S. PATENT DOCUMENTS

| | | | |
|---|---|---|---|
| 5,350,221 A | | 9/1994 | Pearce et al. |
| 5,779,323 A | * | 7/1998 | Burrows ............... B60B 1/0246 301/104 |
| 6,189,978 B1 | * | 2/2001 | Lacombe ............... B60B 1/0246 301/104 |
| 7,354,114 B2 | * | 4/2008 | Passarotto ............... B60B 1/003 301/104 |
| 2004/0174066 A1 | | 9/2004 | Dietrich |
| 2005/0173971 A1 | | 8/2005 | Passarotto et al. |
| 2008/0129105 A1 | * | 6/2008 | Urbani .................. B60B 1/0246 301/57 |

FOREIGN PATENT DOCUMENTS

| | | | | |
|---|---|---|---|---|
| EP | 1955872 B1 | | 4/2010 | |
| IT | EP 1923231 A1 | * | 5/2008 | ........... B60B 1/0246 |
| NL | EP 1955872 A1 | * | 8/2008 | ............. B60B 1/003 |

OTHER PUBLICATIONS

Extended European Search Report from European Patent Application No. 16158821.5, dated Jun. 6, 2017.

* cited by examiner

WHEEL AND SPOKE, IN PARTICULAR FOR A BICYCLE

BACKGROUND

The present invention relates to a spoke and a wheel equipped with at least one such spoke and provided in particular for a bicycle or another at least partially muscle-powered two-wheeled vehicle.

Aerodynamics play a significant role for vehicles in general and in particular for at least partially muscle-powered vehicles since as the speed increases, the power required for driving is influenced the strongest by aerodynamic drag. To reduce the aerodynamic drag for bicycles, closed wheels have become known providing largely reduced aerodynamic drag. These closed wheels show the disadvantage that lateral wind causes quite considerable side wind forces which can considerably impair controlling a two-wheeled vehicle. This is why closed disk wheels are as a rule not employed in road bikes.

In the case of spoke wheels, the spokes considerably contribute to the aerodynamic drag. The spokes whose standard cross-section is round show less than optimal aerodynamic drag values. Therefore, so-called blade spokes have been disclosed comprising a flat cross-section in the traveling direction, thus contributing to reduced aerodynamic drag.

The disadvantage of these blade spokes is, however, a considerably increased sensitivity to lateral wind so that bicycles so equipped show poorer control characteristics in windy conditions so that the use of so-called blade spokes is again limited.

It is therefore the object of the present invention to provide a wheel equipped with spokes and a spoke that is in particular simple to manufacture for such a wheel so as to allow reducing aerodynamic drag while concurrently taking into account the sensitivity to lateral wind.

Further advantages and features of the present invention can be taken from the general description and from the description of the exemplary embodiment.

SUMMARY

A wheel according to the invention is provided to be used with an at least partially muscle-powered bicycle and comprises a hub and a rim. The hub is connected with the rim via a plurality of spokes. At least one of the spokes has a spoke body with two ends remote from one another.

A hub-side first end of the spoke is connected with the hub. This hub-side first end of the spoke is the hub-side end and can also be called the first end of the spoke.

A rim-side second end of the spoke is connected with the rim. The rim-side second end of the spoke is the rim-side end and can also be called the second end of the spoke.

The spoke body is configured elongated and shows at least one longitudinal region in a longitudinal direction of the spoke body having a flattened cross-section accommodated in a longitudinal plane. The spoke body shows in a first end portion at the first respectively hub-side end transverse to the longitudinal plane a first end portion thickness.

The spoke body shows in a second end portion at the second respectively rim-side end transverse to the longitudinal plane a second end portion thickness.

The spoke body shows in a first center region disposed closer to the first end portion than to the second end portion transverse to the longitudinal plane a first center region thickness that is less than the first end portion thickness.

The spoke body shows in a second center region disposed closer to the second end portion than to the first end portion the flattened cross-section comprising a second center region thickness transverse to the longitudinal plane that is less than the first center region thickness.

The wheel according to the invention has many advantages since the wheel allows a clearly reduced aerodynamic drag while simultaneously not increasing the sensitivity to lateral wind over a conventional wheel having consistently identical spoke thicknesses. Manufacturing is simple and cost effective.

In the wheel according to the invention the hub is connected with the hub-side end (first end) of each of a plurality of spokes and the rim is connected with the rim-side end (second end) of each of the plurality of spokes. This is very advantageous since the flattened cross-section in the second center region is disposed radially further outwardly than is the first center region showing a preferably substantially round cross-section. Aerodynamic drag increases quadratically with the relative speed between the spoke and the air. Consequently, the aerodynamic drag is on the whole particularly advantageously reduced by the flattened configuration of the cross-section of the spokes in the further outwardly, second center region. A wheel comprising spokes having in the first center region a cross-section configured e.g. round with a smaller center region thickness compared to the first end portion thickness is advantageous. Namely, a wheel so equipped is aerodynamic where required, and where aerodynamics in the traveling direction are less critical, its surface exposed to lateral wind is smaller.

The thicknesses or cross-sections of the first center region (first center region thickness) and of the second center region (second center region thickness) which are reduced compared to at least one end portion result in a lower total weight of the spokes and the wheel.

In all the configurations it is particularly preferred for the flattened cross-section of the spoke bodies to be substantially parallel to a plane opened up by the rim. Substantially parallel in the sense of the present invention also is a certain degree of inclination of e.g. up to 10° or even up to 20° or in particular also up to 30° relative to the longitudinal direction. A certain inclination is normal and often desired. This is to ensure that the second center region with the flattened cross-section is aligned in the running plane, thus reducing and not increasing aerodynamic drag. An increase might occur if the flattened region were aligned completely or substantially transverse to the traveling direction of a bicycle equipped with such a wheel.

According to the invention the first respectively hub-side end of the spoke body is provided to be connected with the hub and the second respectively rim-side end of the spoke body is provided to be connected with the rim.

The second center region with the flattened cross-section is positioned radially further outwardly than the first center region. Thus, the flattened cross-section of the second center region lies radially further outwardly and is thus exposed to higher peripheral speeds than the first center region which is preferably round or substantially round in cross-section.

When one rides on a bicycle the wheel equipped with such a spoke rolls on the ground or the road. The bottommost point of the wheel shows a relative speed of 0 to the surrounding air respectively to the ground. The topmost point of the wheel respectively the topmost point of the topmost spoke, however, is substantially exposed to double the relative speed of the actual driving speed relative to the surrounding air. A flattened configuration of the cross-section in the farther outwardly, second center region which is exposed to a particularly high circumferential and relative speed is consequently shaped aerodynamically better than in the prior art so as to achieve a noticeably reduced aerodynamic drag in this point.

Concurrently a reduction of the sensitivity to lateral wind is achieved in the center region of the wheel, that is in the first center region that is disposed closer to the hub and that is even reduced in diameter. Overall this decreases the sensitivity to lateral wind of a wheel so equipped over a conventional wheel having spokes of consistently even thicknesses, and quite considerably reduces aerodynamic drag.

A spoke according to the invention comprises a spoke body and is provided for use in a wheel of an at least partially muscle-powered bicycle. The spoke body comprises two ends remote from one another, wherein a first hub-side end is provided to be connected with a hub. The other, rim-side end (second end) is provided to be connected with a rim. The spoke body is configured elongated and shows over at least a longitudinal region in a longitudinal direction of the spoke body at least one flattened cross-section that is at least substantially accommodated in a longitudinal plane. The spoke body shows in a first end portion at the first hub-side end transverse to the longitudinal plane a first end portion thickness. The spoke body shows in a second end portion at the second, rim-side end transverse to the longitudinal plane a second end portion thickness. The spoke body shows in a first center region disposed closer to the first end portion than to the second end portion transverse to the longitudinal plane a first center region thickness that is less than the first end portion thickness. The spoke body shows the flattened cross-section in a second center region disposed closer to the second end portion than to the first end portion. The second center region shows a second center region thickness transverse to the longitudinal plane that is less than the first center region thickness. The flattened cross-section is preferably disposed in the longitudinal plane.

The spoke according to the invention has many advantages. A considerable advantage of the spoke according to the invention is that in the first center region the spoke body has a first center region thickness that is less than the first end portion thickness. In this way aerodynamic drag is reduced in the first center region.

Another advantage is that in the second center region the spoke body shows the flattened cross-section which has a second center region thickness transverse to the longitudinal plane that is even less than the first center region thickness. Thus, there are a number of stepped thickness regions and in the region of the flattened cross-section the second center region thickness is less than in the first center region and also less than the first end portion thickness.

The flattened cross-section may be aligned entirely within, or in parallel to, the longitudinal plane. Or else it is possible for the flattened cross-section of the spoke body in the first center region to not entirely extend within the longitudinal plane or in parallel to the longitudinal plane for example with the first center region slightly curved or very slightly helical. In all the cases the flattened region does not extend transverse to the longitudinal plane but maximally within a region of ±30° and in particular ±20° and preferably ±10° relative to the longitudinal plane. Particularly preferably at least one longitudinal edge of the flattened cross-section is parallel to the longitudinal plane in the range of manufacturing precision of the spoke body.

The fact that the cross-section of the spoke body is not flattened over its entire length but only in the second center region causes a wheel equipped with these spokes to be exposed to just slightly increased—if any—lateral wind loads. At the same time the aerodynamic drag in the traveling direction is considerably reduced so that for one, this two-wheeled vehicle respectively bicycle can achieve high speeds while simultaneously maintaining safety in riding even in gusting or buffeting wind conditions.

The spoke body comprises two ends remote from one another, a first end and a second end. The first end is the hub-side end in the sense of the invention and may be referred to as "first end", "hub-side end", "first hub-side end" and "hub-side first end". The designations are interchangeable. The second end is the rim-side end in the sense of the invention and may be referred to as "second end", "rim-side end", "second rim-side end" and "rim-side second end". These designations are again interchangeable according to the definition of the invention.

In a preferred embodiment the spoke body is constant in cross-section over at least a longitudinal section. The longitudinal section is taken from a group of longitudinal sections comprising the first end portion and the second end portion and the first center region and the second center region.

A constant cross-section in the sense of the present invention is understood to mean a substantially constant cross-section. This means that minor cross-section variations of for example less than 10% and in particular less than 5% over the length of the longitudinal section are disregarded and still considered to be a constant cross-section. Cross-section variations over the length of the longitudinal section preferably lie in a dimensional range of less than 5% and in particular less than 2%.

In a preferred embodiment the spoke body comprises a continuous and/or stepped transition region between at least two longitudinal sections. It is also possible to provide between two adjacent longitudinal sections two or more transition regions similar or different in configuration. Particularly preferably two adjacent longitudinal sections or longitudinal regions are interconnected by way of a continuous or stepped transition region. At least one transition region and preferably all the transition regions are preferably configured short in the longitudinal direction of the spoke body. Preferably all the transition regions are shorter than 20 mm and in particular shorter than 15 mm.

The transition region between the first center region and the second center region preferably extends over a length of less than 15 mm and in particular less than 10 mm. The transition region between the first center region and the second center region is preferably shorter than 10% of the length of the first center region. Particularly preferably a length of the transition region between the first center region and the second center region is about 5%±3% of the length of the first center region although it may be still shorter.

Preferably the length of at least one transition region and preferably of all the transition regions is less than a length of at least one and in particular the shortest end portion.

In advantageous configurations a stepped or angular transition between the end portions and the transition regions is possible.

In a preferred specific embodiment, the spoke body has, transverse to its longitudinal direction and within the longitudinal plane in the first center region, a first center region width that is less than the second center region width in the second center region. In this way reduced aerodynamic drag in the traveling direction is obtained in a vehicle so equipped.

In all the configurations it is preferred to obtain the flattened cross-section in the second center region by way of press-forming the second center region. The spoke according to the invention is simple to manufacture.

Preferably the second center region width is larger than a first end portion width in the first end portion and/or the second center region width is larger than a second end portion width in the second end portion.

In preferred specific embodiments the first end portion and the second end portion and the first center portion show cross-sections similar in configuration. "Cross-sections similar in configuration" in the sense of the present invention is understood to mean that the cross-section shapes are identical in shape while the individual end portions and the first center region may have different cross-sectional dimensions.

Particularly preferably the first end portion and the second end portion have the same cross-sections. In particularly preferred configurations the cross-sections at least of the first end region and the second end region are round and in particular substantially round. Particularly preferably the cross-section in the first center region is also round.

In particularly preferred configurations the spoke is manufactured from a profile section that was originally or substantially configured round wherein the center regions are being tapered in particular by drawing or local hammering and/or cold forging and/or another processing step or machining process so that after the drawing process or machining process two end portions are obtained having larger diameters and for example a homogeneous center region reduced in diameter.

Thereafter part of the homogeneous center region is press-formed so as to obtain the second center region having a flattened cross-section. Consequently, there are two end portions preferably identical in cross-section and a first tapered center region substantially round in cross-section and a second tapered center region having a flattened cross-section. This manufacturing is simple and very cost effective.

Or else it is possible to manufacture the spoke not of an originally round section but of an oval, angular or other cross-sectional profile.

Preferably the flattened cross-section in the second center region shows a cross-sectional shape that is at least approximately oval and/or angular or polygonal and/or elliptic and/or wing-shaped with rounded corners.

In particularly preferred configurations the second center region extends over a length between approximately ⅓ and approximately ⅔ of a length of the spoke body. It is for example possible and preferred for the second center region to extend over approximately 35-55% of the length of the spoke body and particularly preferably over about 45% to 55% of the length of the spoke body. These configurations achieve considerable reduction of the aerodynamic drag while simultaneously the sensitivity to lateral wind is not increased at all or only very moderately or it can even be decreased due to reduced dimensions.

In particularly preferred specific embodiments at least one of the two ends of the spoke body has an external thread and/or an externally threaded attachment means for connecting the spoke body to the rim and/or the hub.

Preferably at least one of the ends of the spoke body is provided with a spoke head for connecting the spoke body via the spoke head with the hub and/or the rim. The spoke head may be configured rotationally symmetrical, mirror-symmetrical, or centro-symmetrical. The spoke head may for example be configured hemispherical or spherical. A T-shaped configuration of the spoke head is also possible.

The spoke head is in particular T-shaped and/or has a "T head". Such a T-shaped spoke head allows to accommodate the spoke non-rotatably at or in the hub. This ensures a fitting and in particular optimal orientation of the spoke relative to the traveling direction.

Preferably the wheel according to the invention is equipped with at least one spoke, as has been described above.

On the whole the invention provides an advantageous spoke and an advantageous wheel which allow to reduce aerodynamic drag while sensitivity to lateral wind is reduced or not increased at all or only slightly. Manufacturing is very simple and cost effective.

BRIEF DESCRIPTION OF THE DRAWINGS

Further advantages and features of the present invention can be taken from the exemplary embodiments which will be described below with reference to the enclosed figures.

The figures show in.

DETAILED DESCRIPTION

Figure 1:
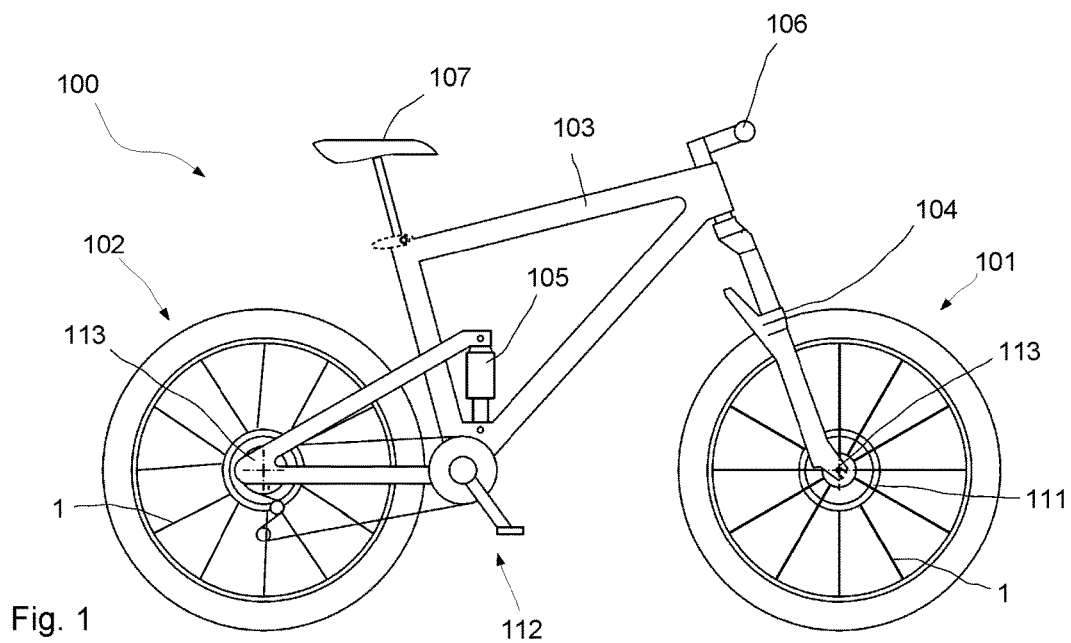
FIG. 1 a schematic side view of a mountain bike.

FIG. 1 shows a schematic illustration of a mountain bike as the bicycle or two-wheeled vehicle 100. The bicycle comprises two wheels 101, 102, a front wheel 101 and a rear wheel 102. Furthermore, a frame 103, a suspension fork 104, a rear wheel damper 105, a handlebar 106, and a saddle 107 are provided. The drive 112 is provided by means of pedals and in this case, a derailleur. The front wheel 101 and the rear wheel 102 are each fastened to dropouts 113 on the fork 104 or the frame 103.

Figure 2:
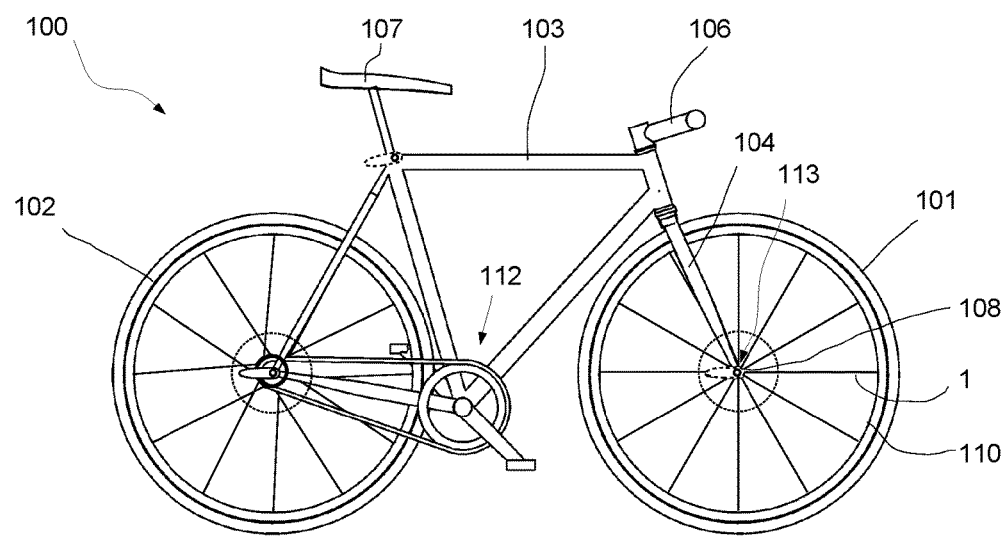
FIG. 2 a schematic side view of a racing bicycle or a roadster.

FIG. 2 shows a simplistic side view of a racing bicycle or roadster as the two-wheeled vehicle 100, the bicycle having an inventive front wheel 101 and an inventive rear wheel 102 as the wheels. The wheels are fastened to the dropouts 113. Both the front wheel and the rear wheel 101, 102 comprise a rim 110 and spokes 1 according to the invention. Due to the scale of the drawings the spokes 1 are illustrated schematically only and they will be discussed in depth below with reference to the further figures.

The wheels 101 and 102 in FIGS. 1 and 2 each comprise spokes 1. Each spoke 1 comprises a hub-side first end 3 and a rim-side second end 4.

Figure 3:
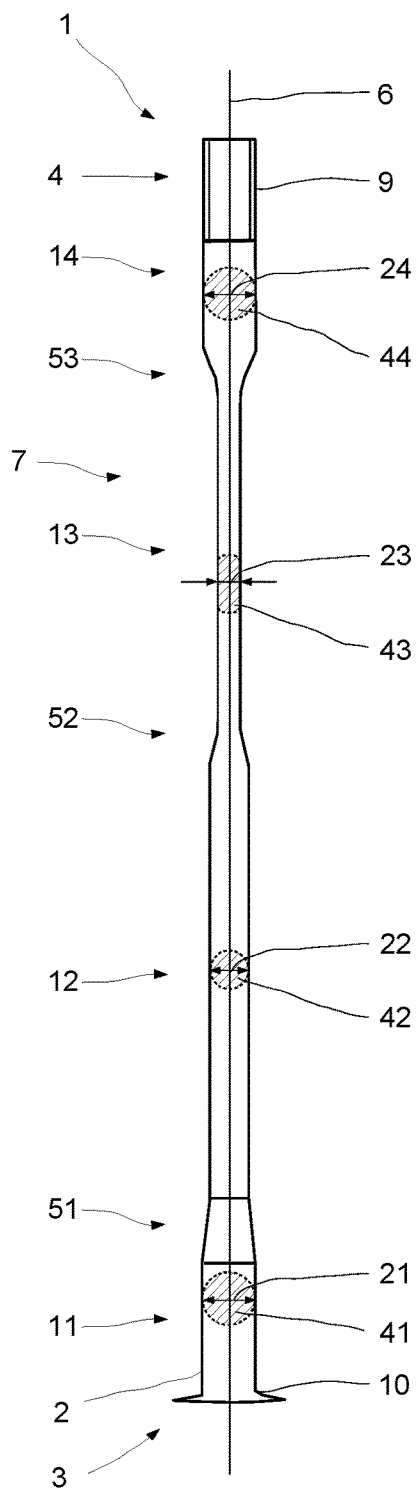
FIG. 3 a schematic side view of a spoke according to the invention along the longitudinal plane.
Figure 4:
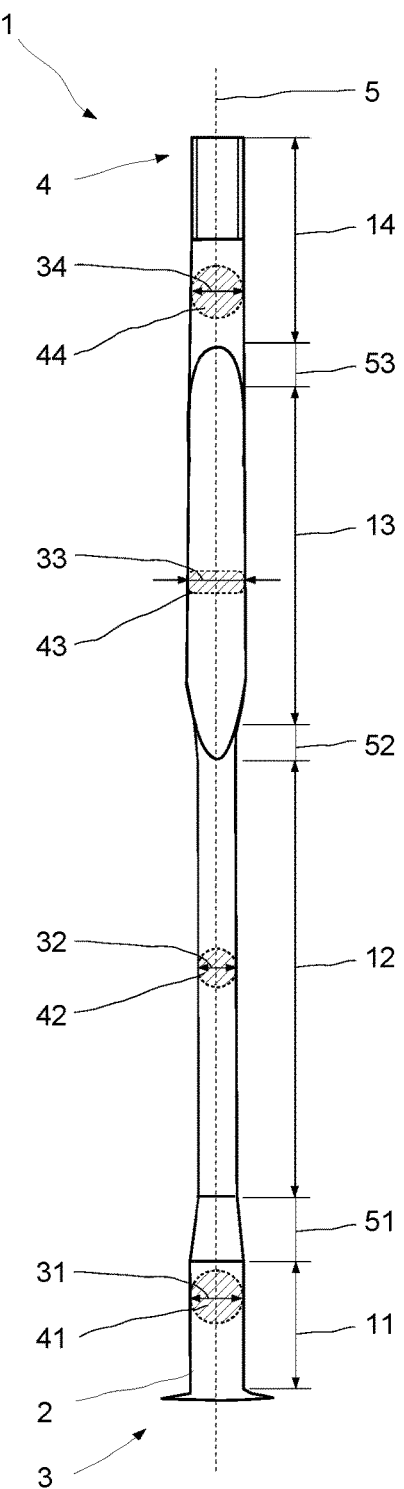
FIG. 4 a schematic transverse view of the spoke from FIG. 3.

FIGS. 3 and 4 illustrate a spoke 1 according to the invention in a longitudinal view and in a side view.

FIG. 3 shows a schematic view, which is not true to scale in particular in the longitudinal direction 5, of a spoke 1 in the traveling direction. Transverse to the plane of the drawing the longitudinal plane 6 extends, along which a bicycle 100 equipped with such a spoke moves.

The spoke 1 is provided at the hub-side end 3 with a spoke head 10 and at the rim-side end 4 with an external thread 9 which serves for a screw-connection with a spoke nipple not illustrated in FIG. 3.

The first respectively hub-side end 3 of the spoke body 2 is attached to the hub 108 and the spoke body 2 extends outwardly from the hub 108 to the second respectively rim-side end 4 where the external thread 9 is then attached to the rim 110 by means of a spoke nipple (not shown).

The spoke body 2 comprises a first end portion 11 adjacent to the first respectively hub-side end 3, a first center region 12, a second center region 13, and a second end portion 14. A transition region 51 is provided between the first end portion 11 and the first center region 12 and a transition region 52 is provided between the first center region 12 and the second center region 13. A transition region 53 is disposed between the second center region 13 and the second end portion 14.

It is also possible to equip the spoke 1 with attachment means other than spoke heads and threads at the end portions 11 and 14 or to attach the spoke to the hub and the rim by means of other suitable attachment means. Preferably, however, the spoke 1 has a spoke head at the hub-side end and an external thread at the rim-side end.

The first end portion 11, the second end portion 14 and the first center region 12 each comprise round cross-sections 41, 42 and 44. These cross-sections 41 and 44 are preferably configured identical. This means that the first end portion thickness 21 in the first end portion 11 substantially coincides with the second end portion thickness 24 at the second end portion 14.

In comparison the first center region thickness 22 at the first center region 12 is noticeably thinner. In a concrete example the first end portion thickness 21 is 2.0 mm, and so is the second end portion thickness 24 at the second end portion 14. The first center region thickness 22 in the first center region 12 is, however, only 1.5 mm.

In the second center region 13, which is disposed closer to the second end portion 14 than the first center region 12, the second center region 13 comprises a second center region thickness 23 which is noticeably thinner than the first center region thickness 22 of the first center region 12. In this case the second center region thickness 23 is only approximately 0.9 mm and it is thus less than half the thickness of the first end portion thickness 21 or the second end portion thickness 24, so as to achieve a quite considerable aerodynamic drag reduction.

The respective cross-sectional shapes in the respective portions or regions are additionally inserted cross-hatched in FIG. 3. It can be clearly seen that the first end portion 11 is substantially round in cross-section 41. Likewise, the first center region 12 is substantially round in cross-section 42. The cross-section 44 in the second end portion 14 is also substantially round.

Unlike thereto, the cross-section 43 in the second center region 13 is configured flattened, as can be taken from the cross-section 43 inserted in dash and dot lines.

FIG. 4 shows a schematic side view of the spoke 1 from FIG. 3, which shows a substantially identical view due to the round end portions 11 and 14 and the round first center region 12.

The view of the second center region 13, where the flattened cross-section 43 of the second center region 13 is shown from the side, is considerably different. While due to the round configurations in the first end portion 11 the first end portion thickness 21 corresponds to the first end portion width 31 and in the second end portion 14 the second end portion thickness 24 corresponds to the second end portion width 34 and in the first center region 12 the first center region thickness 22 corresponds to the first center region width 32, the second center region width 33 considerably differs from the second center region thickness 23. In the exemplary embodiment the center region width 33 is approximately 2.3 mm and thus it is more than twice the second center region thickness 23 which is approximately 0.9 mm.

The transition regions 51, 52, 53 show gradual transitions between the respective portions and regions.

In the longitudinal direction 5 of the spoke body 2 the transition regions 51, 52 and 53 are considerably shorter than the center regions 12 and 13 and presently they are shorter than the end portions 11 and 14. The transition region 52 shows a length of between approximately 5 mm and 10 mm. The transition regions 51 and 53 are configured somewhat longer than is the transition region 52. An axial length of the transition regions 51 and 53 along the spoke body 2 is preferably between 5 mm and 15 mm.

Figures 5, 6:
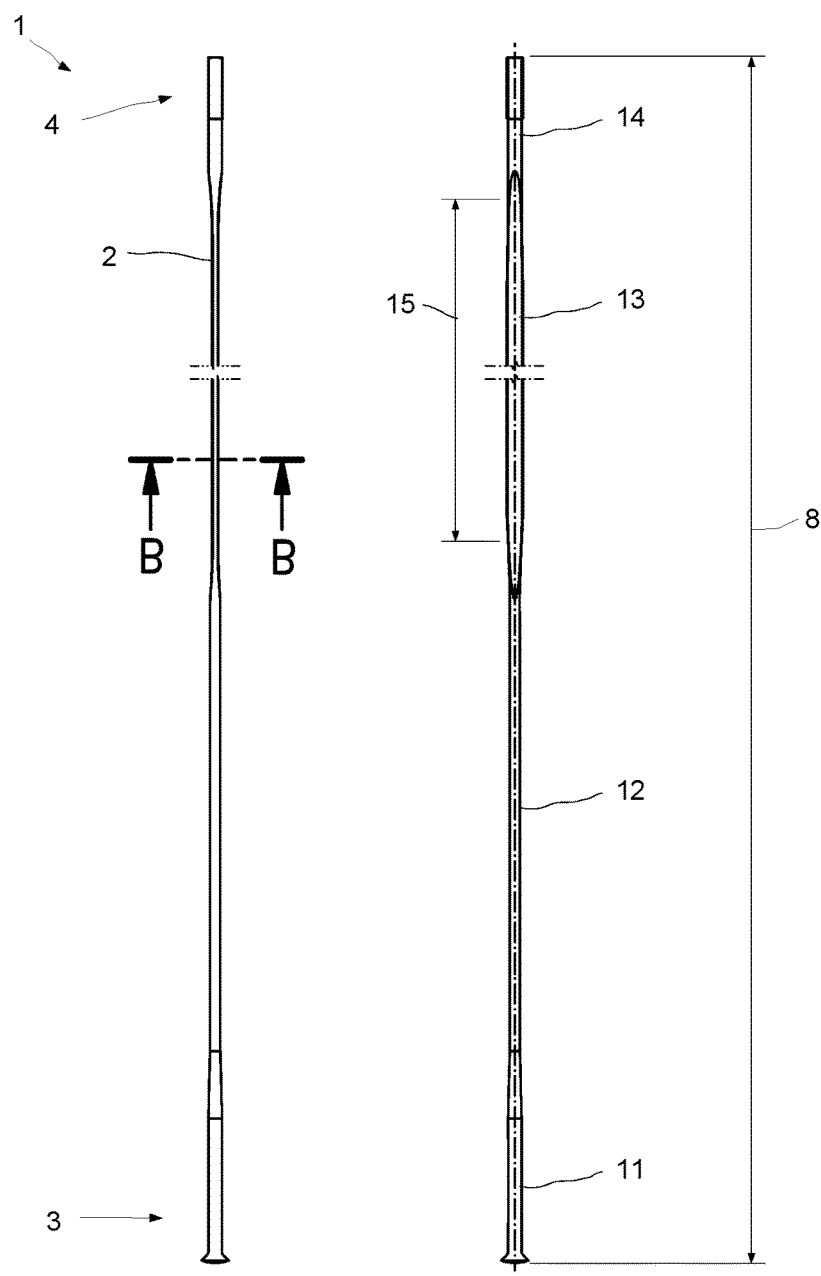
FIG. 5 a schematic illustration of a spoke in the longitudinal direction.
FIG. 6 the spoke according to FIG. 5 in a side view.

FIG. 5 shows a longitudinal view and FIG. 6 shows a side view of another spoke 1 approximately true to scale wherein part of the length is cut away. The length 15 of the second center region 13 with the flattened cross-section 43 is preferably between about ⅔ and about ⅓ of the length 8 of a spoke body 2. In a concrete exemplary embodiment, the second center region 15 is somewhat less than half in length than is the entire spoke body 2.

A length 8 of the entire spoke 1, i.e. from end portion 11 to end portion 14, depends on the application and the installed situation. In a concrete case the length 8 of the spoke body is 290 mm although it may be shorter or longer by e.g. up to 10% or 20%, depending on the rim and installation position etc. A length 15 of the second center region 13 including the transition regions 51 and 52 may be 152 mm in a specific case. The length of the transition regions 51 and 52 is preferably less than 15 mm and it may be 10 mm or less so that a length of the second center region may be approximately 130 mm±10 mm.

Figure 7:
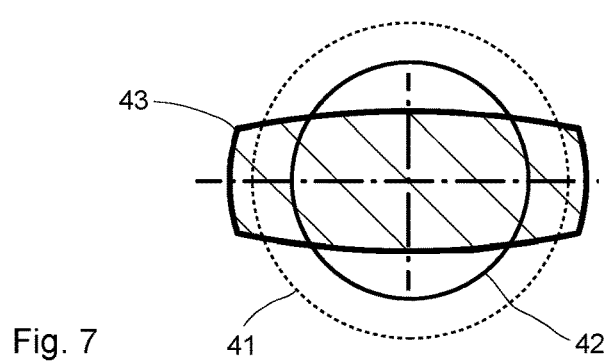
FIG. 7 a few schematic cross sections of the spoke according to FIGS. 5 and 6.

FIG. 7 shows a schematic cross-section of the spoke 1 from FIGS. 5 and 6 with the cross-section 43 shown cross-hatched in the second center region 13. In addition, the round cross-section 42 in the first center region 12 is inserted in a solid line. The second center region 13 is obtained by press-forming or otherwise reshaping a region that was originally round in cross-section 42. Press-forming converts the round material to the flattened shape shown. A flattened shape is manufactured which may for example be approximately oval, elliptic, or square or wing-shaped.

The cross-section 41 from the first end portion 11 is additionally inserted in a dashed line. A body is manufactured from the body that was originally homogeneous in the longitudinal direction by machining or e.g. by drawing, the body is reduced in cross-section in the center regions 12 and 13 while the original diameter is maintained in the first end portion 11 and the second end portion 14. Thereafter the spoke body 12 is press-formed in the second center region 13 so as to obtain the flattened cross-section 43.

Due to the flattened cross-section of the second center region that is provided in the wheels 101 and 102 radially further outwardly than the first center region 12, having a cross-section 42 reduced in diameter, a noticeable reduction of aerodynamic drag is achieved while simultaneously, compared to a wheel having spokes of consistent thicknesses, the sensitivity to lateral wind can even be reduced or remains the same.

LIST OF REFERENCE NUMERALS 1 spoke
2 spoke body
3 hub-side first end
4 rim-side second end
5 longitudinal direction
6 longitudinal plane
7 longitudinal section
8 length of 2
9 thread
10 spoke head
11 first end portion
12 first center region
13 second center region
14 second end portion
15 length of 13
21 first end portion thickness
22 first center region thickness
23 second center region thickness
24 second end portion thickness
31 first end portion width
32 first center region width
33 second center region width
34 second end portion width
41 cross section
42 cross section
43 cross section
44 cross section
51 transition region
52 transition region
53 transition region
100 two-wheeled vehicle, bicycle
101 wheel, front wheel
102 wheel, rear wheel
103 frame
104 fork
105 damper
106 handlebar
107 saddle
108 hub
109 spoke
110 rim
111 brake disk
112 drive
113 dropout

The invention claimed is:

1. A spoke including a spoke body for a wheel of an at least partially muscle-powered bicycle, comprising:
the spoke body comprises a hub-side first end and a rim-side second end wherein the two ends are remote from one another;
the spoke body is configured elongated and comprises over at least one longitudinal region in a longitudinal direction of the spoke body at least one flattened cross-section substantially accommodated in a longitudinal plane;
the spoke body comprises a first end portion thickness in a first end portion at the hub-side first end transverse to the longitudinal plane;
the spoke body comprises a second end portion thickness in a second end portion at the rim-side second end transverse to the longitudinal plane;
the spoke body comprises in a first center region disposed closer to the first end portion than to the second end portion, transverse to the longitudinal plane a first center region thickness that is less than the first end portion thickness; and
the spoke body comprises in a second center region disposed closer to the second end portion than to the first end portion the flattened cross-section comprising a second center region thickness transverse to the longitudinal plane that is less than the first center region thickness.

2. The spoke according to claim 1, wherein the spoke body includes over at least a longitudinal section a constant cross-section wherein the longitudinal section is taken from a group of longitudinal sections comprising the first end portion and the second end portion and the first center region and the second center region.

3. The spoke according to claim 1, wherein the spoke body includes between at least two longitudinal sections a transition region, wherein the transition region is configured continuously and/or stepped.

4. The spoke according to claim 3, wherein at least one transition region is shorter than 10% of a length of the first center region.

5. The spoke according to claim 1, wherein the spoke body has transverse to its longitudinal direction and within the longitudinal plane in the first center region a first center region width which is less than the second center region width in the second center region.

6. The spoke according to claim 1, wherein the second center region width is larger than a first end portion width in the first end portion and/or larger than a second end portion width in the second end portion.

7. The spoke according to claim 1, wherein the first end portion and the second end portion and the first center region comprise cross-sections similar in configuration.

8. The spoke according to claim 1, wherein the first end portion and the second end portion comprise similar cross-sections.

9. The spoke according to claim 1, wherein the cross-sections in the first end region and the second end region are configured round.

10. The spoke according claim 1, wherein the cross-section in the first center region is configured round.

11. The spoke according to claim 1, wherein the flattened cross-section in the second center region is configured oval and/or angular and/or elliptic and/or wing-shaped with rounded corners.

12. The spoke according to claim 1, wherein the second center region extends over a length between ⅓ and ⅔ of a length of the spoke body.

13. The spoke according to claim 1, wherein the spoke body has an external thread at the rim-side end.

14. The spoke according to claim 1, wherein the spoke body comprises a spoke head at the hub-side end.

15. The spoke according to claim 1, wherein the spoke head is configured T-shaped.

16. A wheel of an at least partially muscle-powered bicycle, comprising: a hub and a rim; the hub is connected with the rim through a plurality of spokes wherein at least one of the spokes comprises a spoke body having two ends remote from one another, namely a hub-side, first end and a rim-side, second end;
the hub-side end is connected with the hub and wherein the rim-side end is connected with the rim;
the spoke body is configured elongated and comprises over at least a longitudinal region in a longitudinal direction of the spoke body at least one flattened cross section substantially accommodated in a longitudinal plane;

the spoke body comprises a first end portion thickness in a first end portion at the hub-side first end transverse to the longitudinal plane;

the spoke body comprises a second end portion thickness in a second end portion at the rim-side second end transverse to the longitudinal plane;

the spoke body comprises in a first center region disposed closer to the first end portion than to the second end portion, transverse to the longitudinal plane a first center region thickness that is less than the first end portion thickness; and the spoke body comprises in a second center region disposed closer to the second end portion than to the first end portion the flattened cross-section comprising a second center region thickness transverse to the longitudinal plane that is less than the first center region thickness.

17. The wheel according to claim 16, wherein the flattened cross-section of each of the spoke bodies is aligned substantially parallel to a plane opened up by the rim.

* * * * *